S. I. J. WOLF.
MUSICAL BLOCKS.
APPLICATION FILED JUNE 7, 1910.

1,039,347.

Patented Sept. 24, 1912.
3 SHEETS—SHEET 1.

INVENTOR,
SIDNEY IGNATIUS JOSEPH WOLF,
by
Attorney.

WITNESSES:

S. I. J. WOLF.
MUSICAL BLOCKS.
APPLICATION FILED JUNE 7, 1910.
1,039,347.
Patented Sept. 24, 1912.
3 SHEETS—SHEET 2.
Fig. 5.
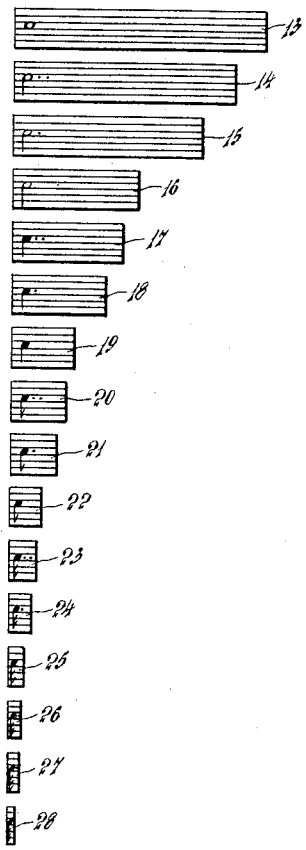
Fig. 6.
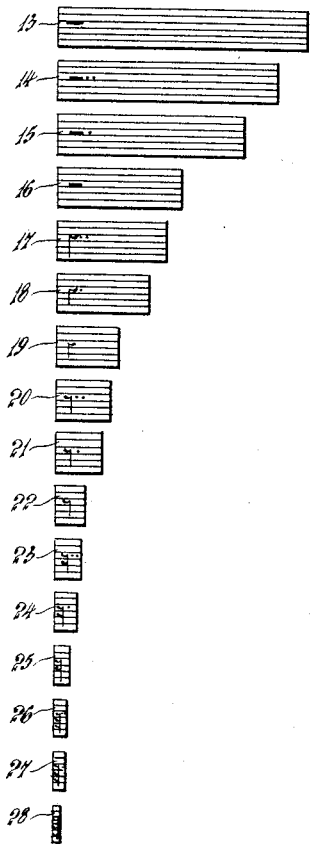
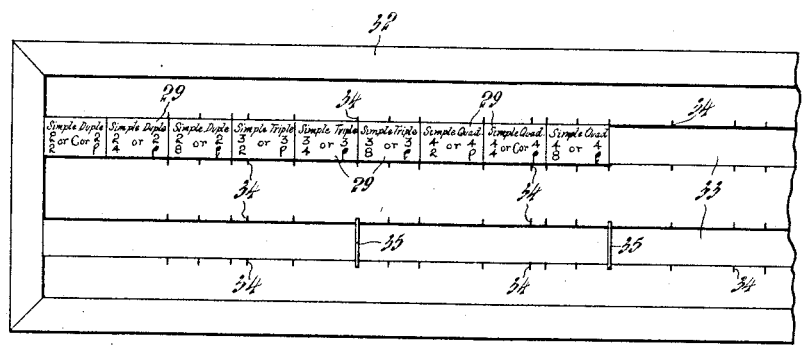
Fig. 7.
WITNESSES:
INVENTOR,
SIDNEY IGNATIUS JOSEPH WOLF,
by
Attorney.

S. I. J. WOLF.
MUSICAL BLOCKS.
APPLICATION FILED JUNE 7, 1910.
1,039,347.
Patented Sept. 24, 1912.
3 SHEETS—SHEET 3.
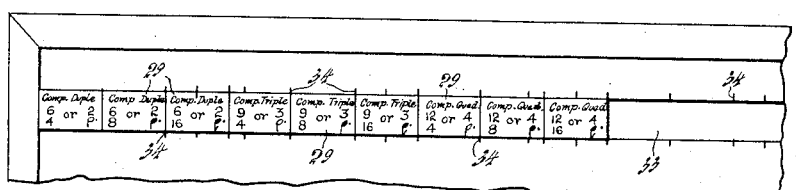
Fig. 8.
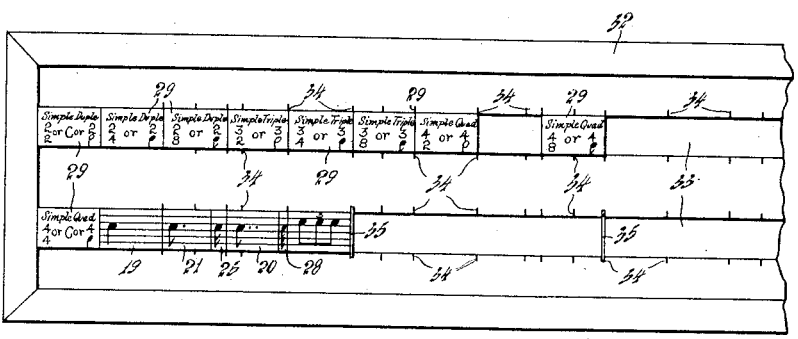
Fig. 9.
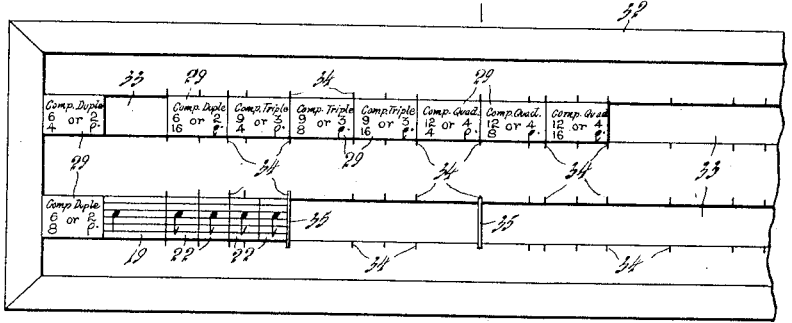
Fig. 10.
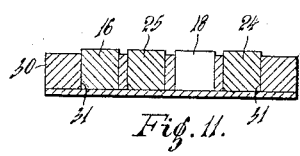
Fig. 11.
Fig. 12.
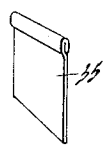
Fig. 13.
WITNESSES;
INVENTOR,
SIDNEY IGNATIUS JOSEPH WOLF.
by
Attorney.

UNITED STATES PATENT OFFICE.

SIDNEY IGNATIUS JOSEPH WOLF, OF DUNEDIN, NEW ZEALAND, ASSIGNOR TO WOLF'S MUSIC TIME BLOCKS LIMITED, OF DUNEDIN, NEW ZEALAND.

MUSICAL BLOCKS.

1,039,347.      Specification of Letters Patent.     Patented Sept. 24, 1912.

Application filed June 7, 1910. Serial No. 565,656.

*To all whom it may concern:*

Be it known that I, SIDNEY IGNATIUS JOSEPH WOLF, a citizen of the Dominion of New Zealand, and residing at 29 Stuart street, Dunedin, in the Provincial District of Otago, in the Dominion of New Zealand, have invented certain new and useful Improvements in Musical Blocks, of which the following is a specification.

This invention relates to appliances for teaching time in music, of the type in which a board is provided with horizontal grooves, while blocks of various lengths representing the values of different notes and rests are intended to be placed in said grooves. In an appliance of this type, the grooves have been divided into four spaces by fixed transverse bars and at one end had immovable divisions indicating the time, common or four time, in which the music was to be set. To this end I have provided horizontal grooves with predetermined incisions for the insertion of removable thin plates across the groove in order to be able to divide the said grooves into different musical measures or bars, according to the time indicated on a removable block at the end of the groove. A magazine board provided with grooves into which the blocks are adapted to fit is used for holding the blocks before use, and a demonstration board similarly grooved has incisions for the insertion across the grooves of thin plates, the incisions being arranged to divide the grooves into different musical measures, so that the note blocks may fit the divisions to correspond to the characters displayed on the time blocks.

The drawings herewith illustrate the invention.

Figure 1:
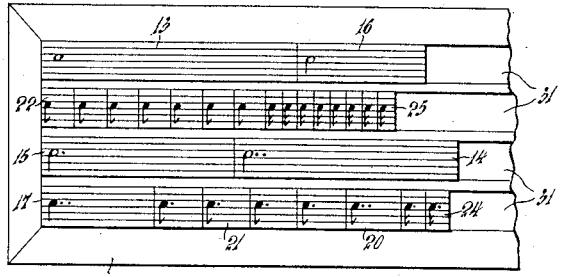
Figure 2:
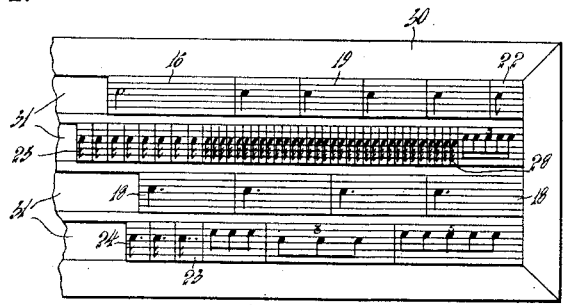
Figure 3:
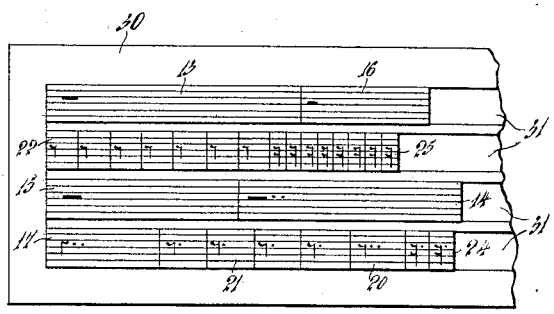
Figure 4:
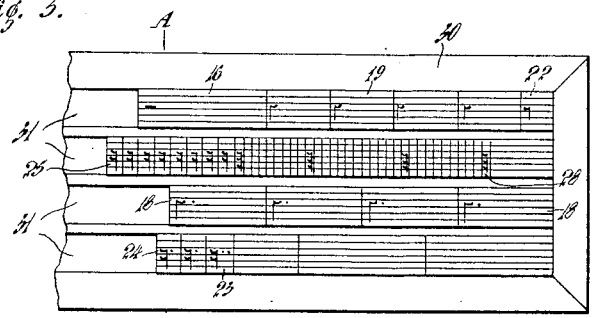

Figure 1, is a plan showing one half, and Fig. 2, a plan showing the other half of the magazine board with note blocks in position, Fig. 3, a half plan showing one half, Fig. 4, a plan showing the other half of the magazine board with note blocks reversed, Fig. 5, a plan of a series of note blocks showing notes of various values, and Fig. 6, a plan showing rest characters on the reverse side of the note blocks. Fig. 7, a plan of a series of time blocks, and Fig. 8, a part plan of a demonstration board showing characters of compound time on the reverse side of the time blocks. Fig. 9, a part plan of a demonstration board showing an example of notation with common time, Fig. 10, a part plan of a demonstration board showing an example of notation with $\frac{6}{8}$ time, and Fig. 11, a sectional elevation on line A—A, Fig. 4, Fig. 12, a sectional elevation on line B—B Fig. 10, Fig. 13, a perspective view of a division plate.

The drawings show blocks with characters upon two sides only, although four sides may be employed, or blocks with a greater number of sides may be used with characters upon each side.

The values of the note blocks in Figs. 5 and 6 are shown by their lengths, thus:—If a semibreve is shown by a block (13) 4 inches long a double dotted minim block (14) will be $3\frac{1}{2}$ inches long, a dotted minim block will be 3 inches long, and so on, as shown by the blocks 15 to 28, Figs. 5 and 6. The rests corresponding to the above notes are displayed as shown in Fig. 6 upon the reverse side of the blocks, the time length of a rest being thus demonstrated by the length of its block.

Upon one side of the series of time blocks 29 shown in Fig. 7 characters employed to denote simple time are displayed, and on the reverse side, compound time is displayed as shown in Fig. 8.

The magazine board 30 is provided with grooves 31 into which the note and time blocks are adapted to fit, the grooves having a depth less than the blocks, as shown in Fig. 11, the projecting portions of which can be readily grasped for purposes of insertion or removal.

The demonstration board 32 has grooves 33 similar to the grooves 31 and incisions 34 are provided for the insertion across the grooves 33 of thin plates 35, see Fig. 12, the incisions being arranged to divide the lengths of the grooves into different musical measures, so that the note blocks may fit the divisions according to the time blocks, thus in the example of notation with common time shown in Fig. 9, the time block 29 displays $$\text{``}\tfrac{4}{4}\text{ or C or }\tfrac{4\text{''}}{f}$$

meaning four four, or common time, or four crotchet beats to the bar. In this time, each beat will consist of a crotchet or of notes of equivalent value, and in the example, the first beat consists of a crotchet, the second beat consists of a dotted quaver and a semi-quaver, the third beat of a double dotted quaver and a demi-semi-quaver, and the fourth beat of a triplet of three quavers.

By reference to the table of lengths of blocks given herein, it will be seen that a crotchet block has a length of one inch. As there are four crotchet beats to the bar the blocks in the whole bar will have a total length of four inches, and the block or blocks in each beat will be one inch in length. The incisions 34 are spaced proper distances apart, and a pupil in arranging a bar of music, will see at once whether he has inserted the correct notes in a beat. If the blocks fall short of an incision, he has not got the full value of notes for a beat, if the blocks surpass an incision he has inserted more than the correct value of notes for the beat. Before a bar has been made up a division plate 35 is inserted in the incisions 34 to close the bar, or the plate may be inserted after the bar has been made up.

The positions of the incisions 34 are determined by placing a time block 29 at the end of a groove as shown in Figs. 9 and 10, and measurements are then taken from the inner end of the block. Assuming that one inch is the length of a crotchet block, For 2/2 time an incision occurs at every 4 inches.
" 2/4 " " " " " " 2 "
" 4/4 " " " " " " 1 "
" 4/8 " " " " " " 6 "
" 2/8 " " " " " " 3 "
" 4/16 " " " " " " 1½ "
" 3/8 " " " " " " ⅜ "
" 3/4 " " " " " " 4 "
" 6/8 " " " " " " 2 "

In the example of six-eight time shown in Fig. 10, the time block 29, shows that there are two dotted crotchets to each bar and a reference to the table herein shows that a note block of a dotted crotchet has a length of one and a half inches. The whole length of the bar will, therefore, be three inches. The first beat is made up of a crotchet and a quaver, and the second beat of three quavers, in each case corresponding in value to a dotted crotchet. If a pupil desires to test the accuracy of his work he would remove, for example, the crotchet and the quaver of the first beat in this Fig. 10, and insert a block marked with a dotted crotchet, which he would find would exactly fit the space of the first beat.

What I do claim and desire to secure by Letters Patent of the United States is:—

1. An appliance for teaching time in music, comprising a board having therein horizontal grooves and vertically disposed incisions intersecting said grooves at regular intervals, removable plates adapted to be inserted in any of said incisions for dividing the grooves into musical measures, and a removable block at the end of the groove carrying a sign representing musical time.

2. In an appliance for teaching time in music, the combination of a board having therein horizontal grooves and alined pairs of vertically disposed incisions communicating with the grooves at right angles thereto, said grooves being approximately as deep as wide; removable plates inserted in any of said incisions and positively held by the sides of the incisions against movement longitudinally of the grooves; removable blocks of square transverse-section in said grooves and each provided on one side with a character representing a note and on the opposite side with a character representing a corresponding rest; and a removable block at the left hand end of each of said grooves having on one side a character representing simple time and on the opposite side a character representing compound time.

In testimony whereof I have affixed my signature in presence of two witnesses.

SIDNEY IGNATIUS JOSEPH WOLF.

Witnesses:
ERNEST SMITH BALDWIN,
ANNIE DOROTHY McKENZIE.

---

Copies of this patent may be obtained for five cents each, by addressing the "Commissioner of Patents, Washington, D. C."